United States Patent [19]

Plourde

[11] 4,146,101
[45] Mar. 27, 1979

[54] SNOW CYCLE VEHICLE

[76] Inventor: Aimé Plourde, 2è rang centre, Trois-Pistoles, Canada

[21] Appl. No.: 742,258

[22] Filed: Nov. 16, 1976

[51] Int. Cl.² .......................................... B62M 27/02
[52] U.S. Cl. ................................................ 180/5 R
[58] Field of Search ........................ 280/28; 180/5 R

[56] References Cited

U.S. PATENT DOCUMENTS

| 3,620,318 | 11/1971 | Gostomski | 180/5 R |
| 3,860,079 | 1/1975 | Hoffman | 180/5 R |

Primary Examiner—Richard A. Bertsch

[57] ABSTRACT

A vehicle called a snow cycle vehicle due to its structural as well as operational resemblance with a motor cycle. This snow cycle distinctively includes a body of the bicycle or motor cycle type, a compact endless track and drive unit with the latter being longitudinally and resiliently pivotable and carrying the rear portion of the body, a steering having a steering reduction ratio between the handle bar and a front ski, and adjustable connection between the body and the endless track and drive unit, and a manually-adjustable suspension between the body and the endless track unit. This snow cycle vehicle also includes spring-biased suspension arms and a manually-adjustable spring resiliently supporting the rear portion of the body and the steering reduction ratio is produced by pivoting the ski through a crank arm about an axis parallel to the pivot axis of the handle bar.

9 Claims, 7 Drawing Figures

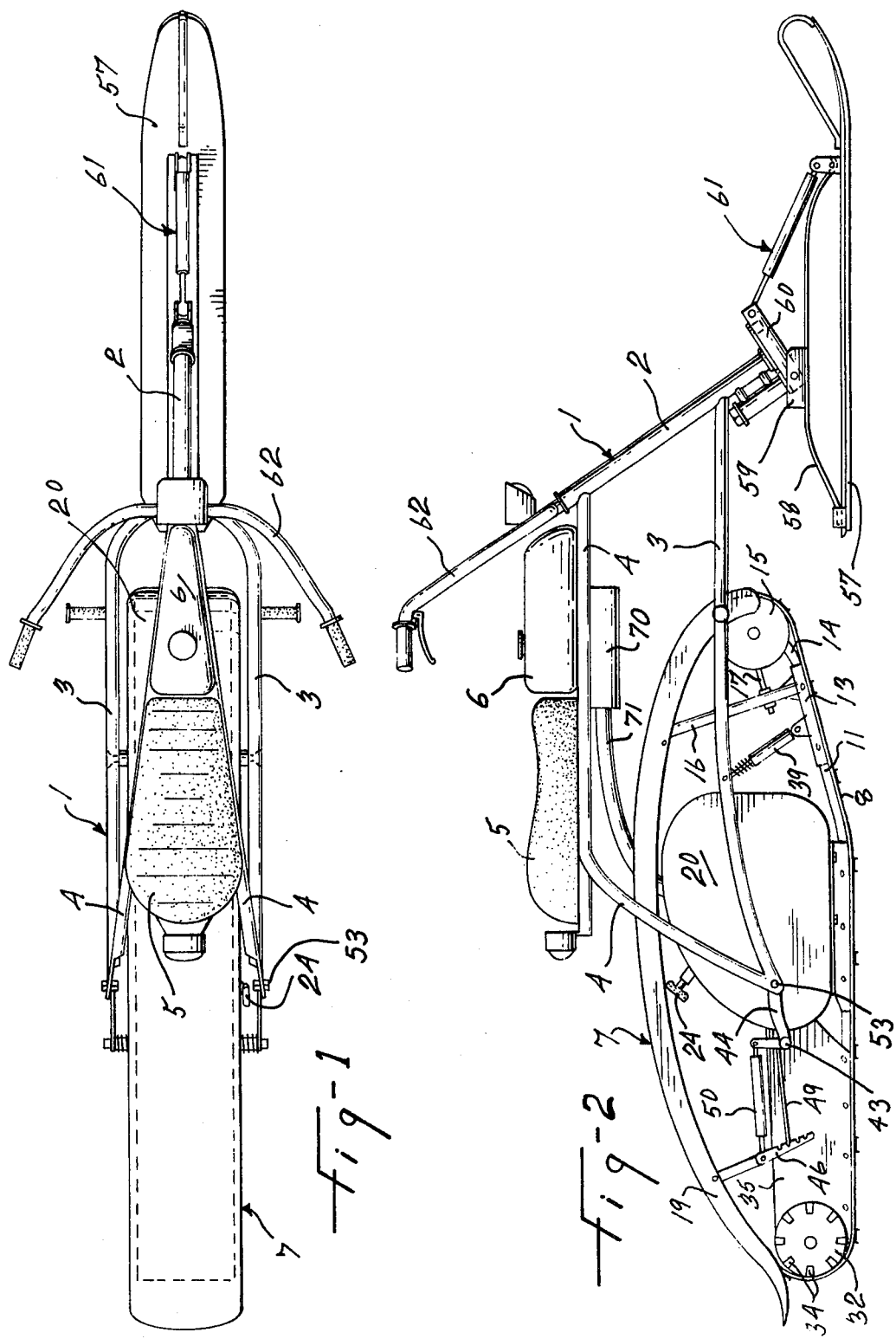

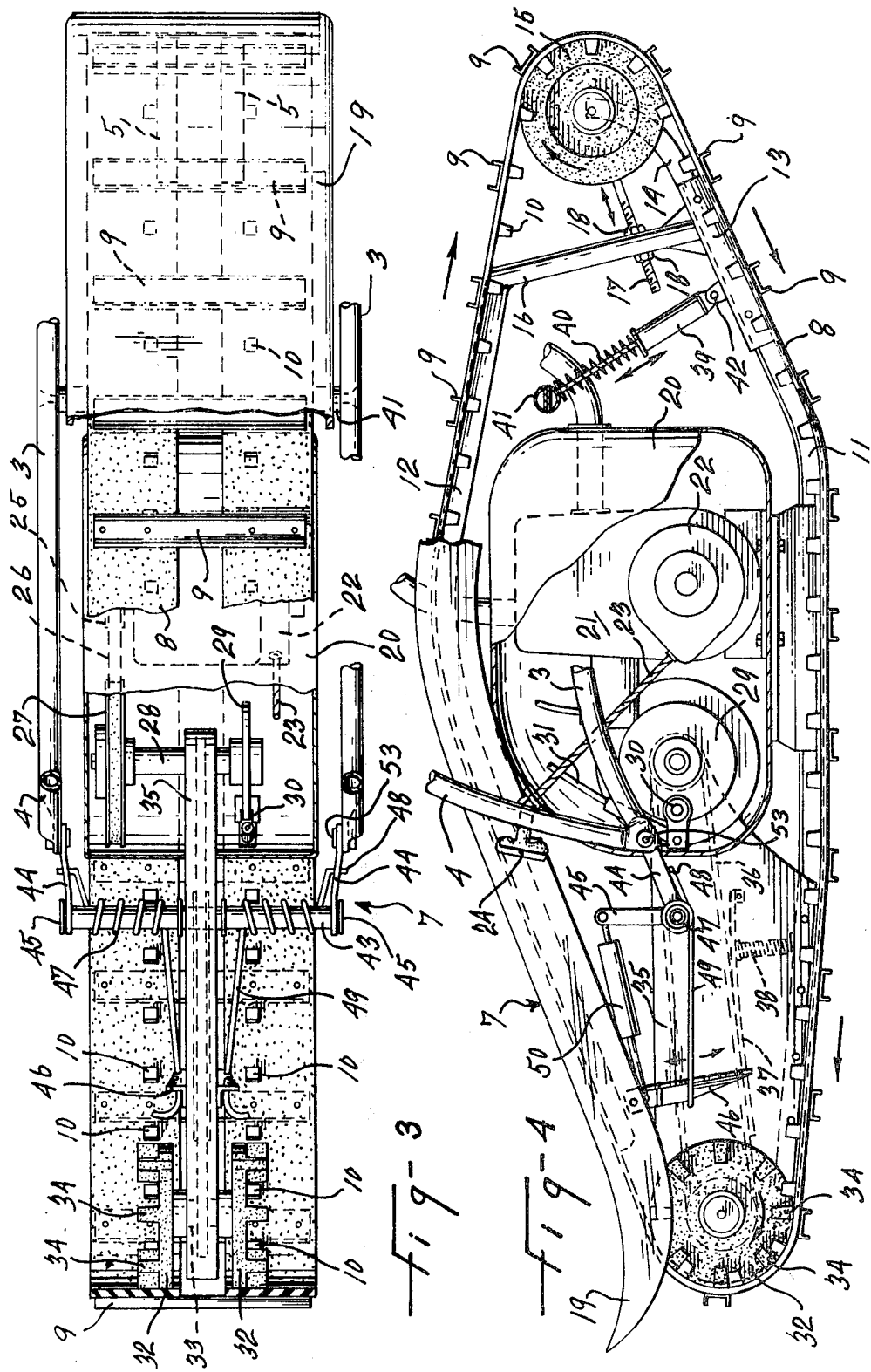

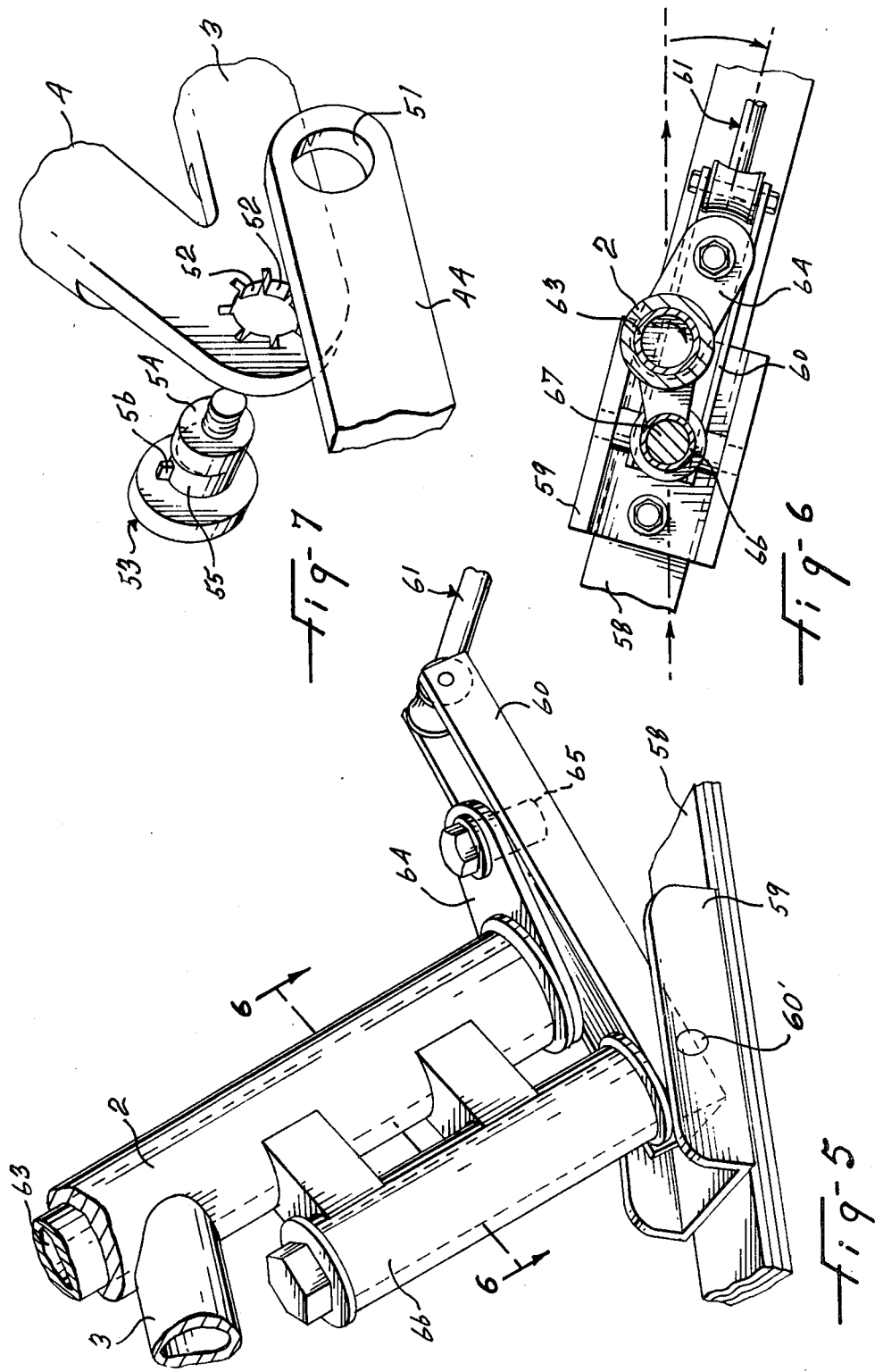

SNOW CYCLE VEHICLE

This invention relates to a snow vehicle and, more particularly, to a light snow vehicle of the type including at least one endless track in combination with at least one ski.

So far, there have been proposed many concepts of snow vehicles of the above type, such as for instance the conventional snowmobile with a rear endless track, front skis and a motor mounted on the front portion of the body. There has also been proposed in U.S. Pat. No. 3,734,221 a vehicle wherein the whole traction assembly constitutes a compact endless track and drive unit with the endless track surrounding the drive assembly. In both cases, the snow vehicle is relatively wide, has limited, if any, resilient suspension between the body and the endless track unit solely aiming at providing a softer ride, and has a body structurally suggestive of the body of an automobile. Consequently, the behavior, performance and operation of such preceding snowmobiles are related to those of an automobile.

It is a general object of the present invention to provide a snow vehicle of relatively simpler and more economical construction and whose behavior, performances and operation are closely associated to those of a motor cycle.

It is another general object of the present invention to provide a snow vehicle of the above type which has a body and the general configuration of a motor cycle.

It is a further general object of the present invention to provide a snow vehicle of the above type with a longitudinally and resiliently pivotable and loaded endless track unit for efficient engagement of the lower run of the endless track with the supporting snow.

It is another object of the present invention to provide a snow vehicle of the above type, which includes a compact endless track and drive unit and an improved suspension system connecting the latter and the body of the vehicle.

It is a further object of the present invention to provide a snow vehicle of the above type which includes an endless track unit and a longitudinally pivotable and manually-adjustable resilient suspension system between the endlss track unit and the body of the vehicle.

It is still another object of the present invention to provide a snow vehicle which includes a steering assembly producing a simple and efficient steering reduction ratio between the steering member and the ski supporting the front of the vehicle.

It is a still further object of the present invention to provide a snow vehicle of the above type which includes a body, an endless track unit supporting the rear portion of the body and a simply adjustable connection between the endless track unit and the body.

The above and other objects and advantages of the present invention will be better understood with reference to the following description of a preferred embodiment thereof which is illustrated, by way of example, in the accompanying drawings, wherein:

FIG. 1 is a top view of a snow cycle vehicle according to the present invention;

FIG. 2 is a side elevation view of the same vehicle;

FIG. 3 is a top view with parts broken away of the endless track unit forming part of the vehicle of FIG. 1;

FIG. 4 is a side elevation view of the endless track unit with parts broken away;

FIG. 5 is a perspective view of the pivotal connection between the body and the ski and illustrating the steering assembly producing a fractional steering ratio;

FIG. 6 is a cross-sectional view as seen along line 6—6 in FIG. 5; and

FIG. 7 is a perspective view of an adjustable connection between the body of the snow cycle vehicle and a spring-biased suspension arm.

The illustrated snow cycle vehicle includes a body 1, of tubular construction, comprising a forward steering column portion 2 and a pair of sides each having a bottom tubular portion 3 and a top tubular portion 4. The sides of the tubular body are laterally spaced apart at the rear and merge at the steering column portion 2. The two top tubular portions 4 defined by the opposite sides of the body cooperatively form a support for the saddle 5 and a gas tank 6 intermediate the saddle and the steering column portion 2.

An endless track unit 7 supports the rear portion of the body 1 and includes a frame, an endless track which travels around the frame, and a drive assembly to produce the travel of the endless track.

The endless track includes a pair of endless belts 8 laterally spaced apart edgewise and grouser bars 9 fixed against the ground-engaging outer face of the endless belts and extending lengthwise transversely of the latter. Each endless belt 8 is made of rubber, or the like material, and is integrally formed with a series of studs, or lugs 10, projecting from the inner face thereof.

The frame of the endless track unit 7 includes a lower and an upper elongated guide members 11 and 12 suitably longitudinally bent to guide the lower and the upper runs respectively of the endless belts. The lower guide member 11 has a channel portion 13 rigidly fixed thereto and forming a slideway for a runner 14. The latter slides endwise in the channel portion 13 and longitudinally of the endless track unit 7. The runner 14 is upwardly bent at its front end and carries a transverse shaft on which are rotatably mounted a pair of idler wheels 15. The two idler wheels are axially spaced apart and engage the two endless belts 8 respectively to carry the latter and to laterally center the endless track by lateral engagement with the lugs or studs 10. A post 16 rigidly joins the forward end of the upper guide member 12 to the channel member 13. A bolt 17 is fixed at the forward end of the runner 14 and is adjustably secured to the post 16 by the adjustment nuts 18 tightening on the bolt 17 against the opposite sides respectively of the post.

It will be readily understood that screwing or unscrewing of both nuts 18 will produce endwise displacement of the bolt 17 and the runner 14 and the same radial displacement of the two idler wheels 15. There thus results either tightening or loosening of the endless track.

A mud-guard 19 is fixed to the upper guide member 12 and extends in overlying relationship relative to the endless belts 8.

The drive assembly for the endless track and drive unit 7 includes a motor housing 20 within the confines of the frame of unit 7, enclosing an internal combustion engine 21, secured to lower guide member 11, a startor 22, of conventional construction, and actuated by a cord 23 having a handle 24 fixed to the outer end thereof and remaining accessible externally of the housing 20. The engine 21 drives a pulley 25. The latter drives by a belt 26 a pulley 27 rotatable with a transverse shaft 28 in the housing 20. A brake disc 29 is fixed to the auxiliary shaft 28 for bodily rotation therewith. Braking shoes 30 are fixed to straddle the brake disc 29 and are actuated by an actuation rod 31.

A pair of traction sprockets 32 are fixed to a transverse shaft 33 for bodily rotation therewith. Each sprocket 32 is provided with equally spaced-apart lateral teeth 34 laterally projecting toward engagement with the lugs 10 of the endless belts 8.

The endless track unit 7 further includes an elongated and narrow casing 35 secured to the lower guide member 11 and extending lengthwise longitudinally of the endless track unit, intermediate the two endless belts 8, and from the auxiliary shaft 23 to the rear shaft 33 carrying the two sprockets 32. Shafts 28 and 33 are journalled in casing 35. The casing 35 encloses a chain drive including a pair of sprockets rigidly fixed to the two shafts 28 and 33 respectively. The casing 35 also encloses a chain 36 engaged around these sprockets. Thus, the rotation of the motor 21 drives the endless track through the pulley 25, the belt 26, the pulley 27, the shaft 28, the sprockets and the chain 36 in the casing 35, the shaft 33 and the sprockets 32. The chain 36 is maintained tight by a nylon covered steel strip 37 biased by a spring 38 against the lower run of the chain.

The suspension system supporting the body 1 on the endless track and drive unit 7 includes a front suspension assembly and a rear suspension assembly. This front suspension assembly includes a shock-absorbing hydraulic cylinder 39 and a spring 40 around the stem, or rod, of the hydraulic cylinder. The shock-absorbing cylinder 39 is connected at one end to a crossbar 41 fixedly mounted or secured to the lower tubular members 3 on opposite sides of the body 1. The shock-absorbing cylinder is pivotally secured at its lower end by a pin 42 to the channel member 13.

The rear suspension assembly includes a shaft 43 transversely extending through the casing 35, rotatable therein and projecting from opposite sides thereof. A pair of suspension arms 44 are fixed to the opposite ends respectively of the shaft 43 to rotate therewith and are pivotally connected at 53 to the rear portion of the body 1. A pair of arms, or levers 45, are also fixed to the opposite ends respectively of the shaft 43 to rotate therewith and thus also to move bodily with the suspension arms 44. A pair of brackets 40 are fixed to the casing 35 and thus to the frame of the endless track unit 7, on opposite sides respectively of the casing 35, and are formed each with a plurality of adjustment notches or recesses upwardly aligned along one edge of the corresponding bracket. A pair of spring wires 47 are engaged on the opposite ends of the shaft 43. Each spring wire 47 includes a central portion coiled on the shaft 43 and a pair of opposite ends 48 and 49. The end 48 is bent and arranged to upwardly bias the corresponding suspension arm 44 while the other end 49 is engaged in a selected adjustment notch, or recess, of the corresponding bracket.

It must be appreciated that the spring bias of the second suspension assembly is manually adjustable by changing the position of this other end of the spring from one to another of the adjustment notches. A shock-absorbing hydraulic cylinder 50 is connected to each bracket 46 and to each lever, or arm 45, to absorb the shocks. The suspension arms 44 are pivotally connected at 53 to the rear portion of the body 1 at the junction between the bottom and the top tubular portions 3 and 4.

As shown in detail in FIG. 7, the suspension arm 44 is also adjustably connected to the tubular portions 3 and 4. This connection includes a hole 51 in the forward end of the suspension arm 44, a dented aperture 52 at the junction of the tubular portions 3 and 4, and an adjustable connector 53 including a stem having an eccentric cylindrical portion 54, and a cylindrical portion 55 provided with a radial projection or lug 56. The adjustable connector 53 is selectively rotated to set the lug 56 in one of the notches of aperture 52. Thus, the eccentric cam or member 54 is selectively positionable angularly in the hole 51, such as to adjust or set the suspension arm 44 and, thus, the whole endless track unit relative to the body 1. It is thus possible to properly longitudinally align the unit 7 relative to body 1 to compensate for defects in the transverse alignment of apertures 52 during manufacture or as a result of deformation of body 1 when hitting an obstacle.

The center of sustentation or load bearing of the endless belts 8 on snow is longitudinally under the internal combustion engine 21. The endless track unit 7 advantageously pivots about the shaft 43 rearward of the afore-mentioned longitudinal center of sustentation and also rearward of the suspension pivot defined by the adjustable connectors 53 on opposite sides respectively of the body 1. Body 1 can also move down relative to unit 7 against action of spring wires 47 and shock absorbers 50.

The front ski and steering assembly, as shown in detail in FIGS. 5 and 6, includes a ski unit and a steering assembly. The ski unit includes a ski 57, of any conventional construction, and a spring blade 58 operatively mounted thereon as known in the art. A bracket 59 is fixed on top of the spring blade 58. A channel shape member 60 extends lengthwise longitudinally of the ski 57; has its open side facing upward; and is pivoted at its rear end to the bracket 59 on the spring blade 58 about a transverse pivot 60'. A hydraulic cylinder 61 is connected between the forward end of the channel shape member 60 and the forward portion of the ski 57. The channel shape member 60 is thus held substantially perpendicular to the steering column portion 2. Handle bars 62 are mounted on the body 1 and are rigidly fixed to a steering post 63 rotatably engaged in the steering column portion 2. A crank arm 64 is rigidly fixed to the lower end of the steering post 63 to bodily rotate with the latter and the handle bars 62. A pin, or stud 65, downwardly projects from the free end of the crank arm 64 into operative engagement between the laterally opposite side flanges of the channel member 60. A tubular member 66 is rigidly fixed behind and parallel to the steering column portion 2. A pivoting post 67 is rotatably held in the tubular member 66 and is ridigly fixed at its lower end to the channel member 60 to bodily pivot therewith about an axis parallel to the axis of the steering post 63. Thus, the post 67 defines the steering axis of the ski 57.

The afore-described ski and steering assembly are thus adapted and constructed such that, when the handle bars 62 are pivoted a given angle, the crank arm 64 also pivots the same angle; the stud 65 laterally pushes on one flange of the channel member 60 and is laterally guided by the latter; the channel member is thus pivoted about the steering axis at a lower rate and a smaller angle compared to the pivoting of the crank arm 64 and handle bar, as can be seen in FIG. 6. In a practical embodiment, the afore-described assembly produced a steering reduction ratio of 2 to 1 between the handle bars 62 and the ski 57. An intake air silencer device 70 is fixed to top tubular portion 4 of body 1 under gas tank 6 and is connected by a flexible tube 71 to the air intake of the carburator of engine 21. Therefore, the air inlet of silencer 70 is protected against access therein of foreign matter.

It must be understood that many changes in the details of construction may be made without departing from the spirit and scope of the invention defined by the appended claims.

What I claim is:

1. A snow cycle vehicle comprising a body having a front portion and a rear portion, a front ground-engaging and steering assembly operatively connected to the front portion of said body and steeringly supporting the same, an endless track unit including a frame, an endless track travelling around said frame, and drive means mounted on said frame and operatively driving the endless track around said frame lengthwise of said body, a first resilient suspension operatively connecting said frame to the rear portion of said body, the latter including laterally spaced-apart rear projections laterally straddling said endless track unit, and a second resilient suspension longitudinally spaced rearwardly from said first resilient suspension along the length of said body and including a pair of spring-biased suspension arms pivoted to said frame on opposite sides thereof, respectively, pivotally connected to the respective rear projections, and cooperating with said first resilient suspension for resilient pivotal suspension of the rear portion of said body on said frame and an adjustable spring connected to each of said suspension arms and producing the spring bias thereon.

2. A snow cycle vehicle as defined in claim 1, wherein said front ground-engaging and steering assembly includes a ski unit pivoted to said front portion about a first upwardly extending axis, a steering post pivoted to said front portion about a second axis longitudinally extending along and spaced from said first axis, and a crank arm fixed to said steering post for bodily rotation therewith, said crank arm directed away from said first axis and having an outer end pivotally and slidably engaging said ski unit, and steering the latter about said first axis through a given angle upon bodily rotation of said steering post and said crank arm about said second axis through a greater angle.

3. A snow cycle vehicle as defined in claim 2, wherein said ski unit includes a ski, an elongated member extending longitudinally of the ski, pivoted to the latter about a transverse axis, and defining a guideway cammingly engaged by the outer end of said crank arm and bodily pivotable with said ski about said first axis upon pivoting of said crank arm about said second axis.

4. A snow cycle vehicle as defined in claim 3, wherein said elongated member includes a channel member having a channel defining an upwardly open end, said crank arm includes an actuation pin slidably projecting into engagement in said channel, a shock absorber is connected between said ski and said channel member and resiliently biases said ski relative to said body, each of said rear projections includes a peripherally dented aperture extending transversely therethrough and operatively registering with a hole in the corresponding arm of the second resilient suspension, and a connector having a stem defining an eccentric portion engageable in said hole and a main portion having a peripheral lug fixedly secured to the eccentric portion, angularly settable in said dented aperture into selective angular engagement of said lug around the periphery of the dented aperture and a corresponding eccentric engagement of the eccentric portion in the hole of the corresponding suspension arm.

5. A snow cycle vehicle as defined in claim 1, further including an adjustable connection adjustably joining each rear projection to the associated spring-biased suspension arm.

6. A snow cycle vehicle as defined in claim 1, wherein said second resilient suspension includes a shaft carried by said frame longitudinally extending transversely to the frame, and defining outer end portions on opposite sides respectively of the frame, said pair of suspension arms being rigidly fixed to said shaft and bodily pivotable therewith about the axis thereof, means secured to said frame defining a plurality of adjustment recesses angularly spaced relative to said shaft, and each of the adjustable springs constitutes a spring wire having a central portion coiled around said shaft, one end portion engaging one of said suspension arms and upwardly biasing the same and another end portion selectively adjustable into one of said plurality of adjustment recesses for selective adjustment of the tension in said springs.

7. A snow cycle vehicle as defined in claim 6, wherein a second pair of arms are rigidly fixed to said shaft and bodily pivotable with the latter and with said first named pair of arms, hydraulic shock absorbers are connected between said frame and said second pair of arms respectively, and said first resilient suspension includes a shock absorber connected between the forward portion of said frame and said body forwardly of said second resilient suspension.

8. A snow cycle vehicle as defined in claim 7, further including a saddle fixedly secured on an upper portion of said body, a gas tank fixedly secured on said upper portion forward of said saddle, and an intake air silencer device fixedly secured to said body and underlying said gas tank, thereby protecting the inlet of said silencer against access therein of foreign elements.

9. A snow cycle vehicle comprising an elongated body having a front portion and a rear portion, a seat secured on top of said body, a front ground-engaging and steering assembly operatively connected to the front portion of said body and steeringly supporting the same, an endless track unit including an elongated frame forming top and bottom track guides interrupted at the front and back of said frame, a pair of idler wheels carried by said frame within the front interruption of said track guides, a pair of driving sprockets carried by said frame within the back interruption of said track guides, an endless track surrounding said frame, trained on said idler wheels and on said driving sprockets and in slidable and guided engagement with said track guides, an internal combustion engine secured to, and located, within said frame between said top and bottom track guides and intermediate said idler wheels and said driving sprockets, a transmission means between said engine and said driving sprockets mounted within said frame, said body rear portion including laterally spaced-apart rear projections laterally straddling said endless track unit, said frame being connected to said projections on each side of said frame by means allowing up-and-down movement and rotational movement of said entire unit relative to said body, said rotational movement being effected about a pivotal axis which is transverse to said body and which is located intermediate said top and bottom track guides and intermediate said front idler wheels and said rear driving sprockets, a first resilient suspension connecting said frame to said body forwardly of said pivotal axis to resiliently resist pivotal movement of said unit relative to said body and second resilient suspension means to resiliently resist down movement of said body relative to said frame.

* * * * *